H. E. WHITE.
MACHINE FOR MAKING EXPANDED METAL.
APPLICATION FILED DEC. 14, 1915.
1,198,686.
Patented Sept. 19, 1916.
6 SHEETS—SHEET 3.
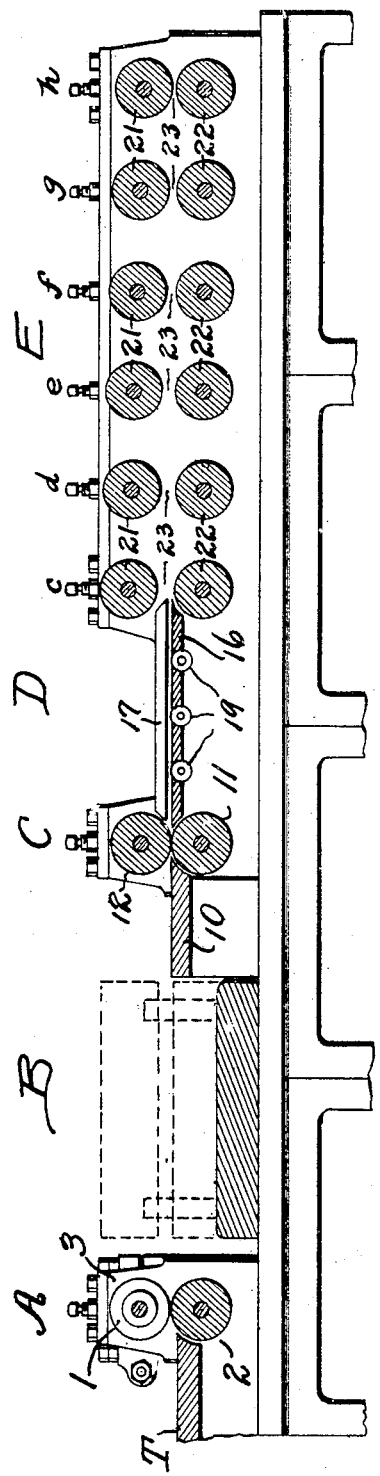
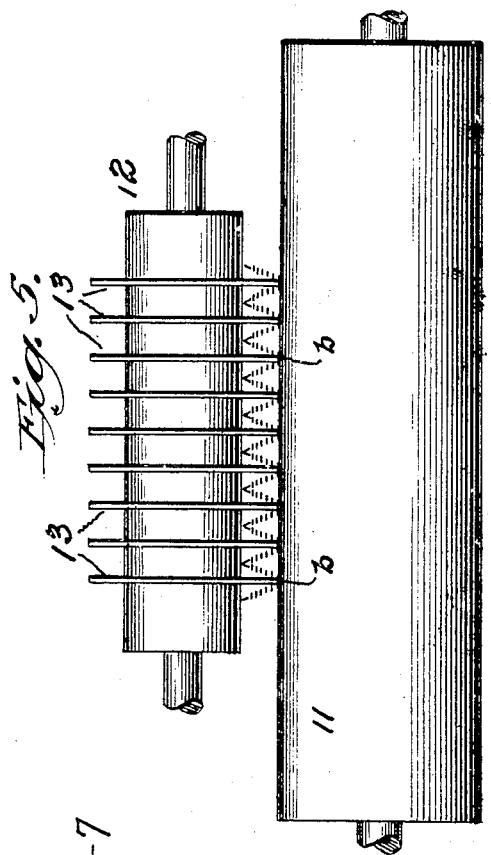
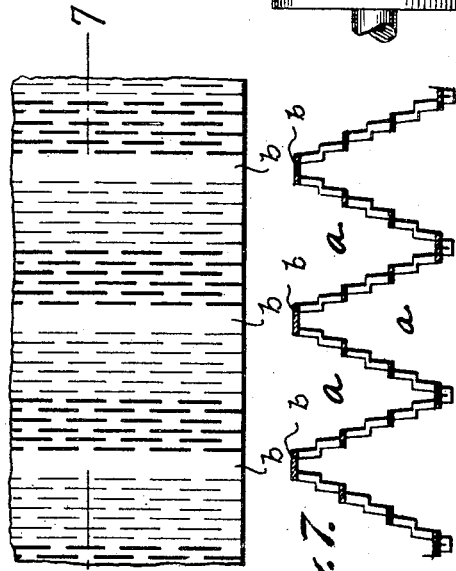
Inventor
HERBERT E. WHITE
Witness
By
Attorney

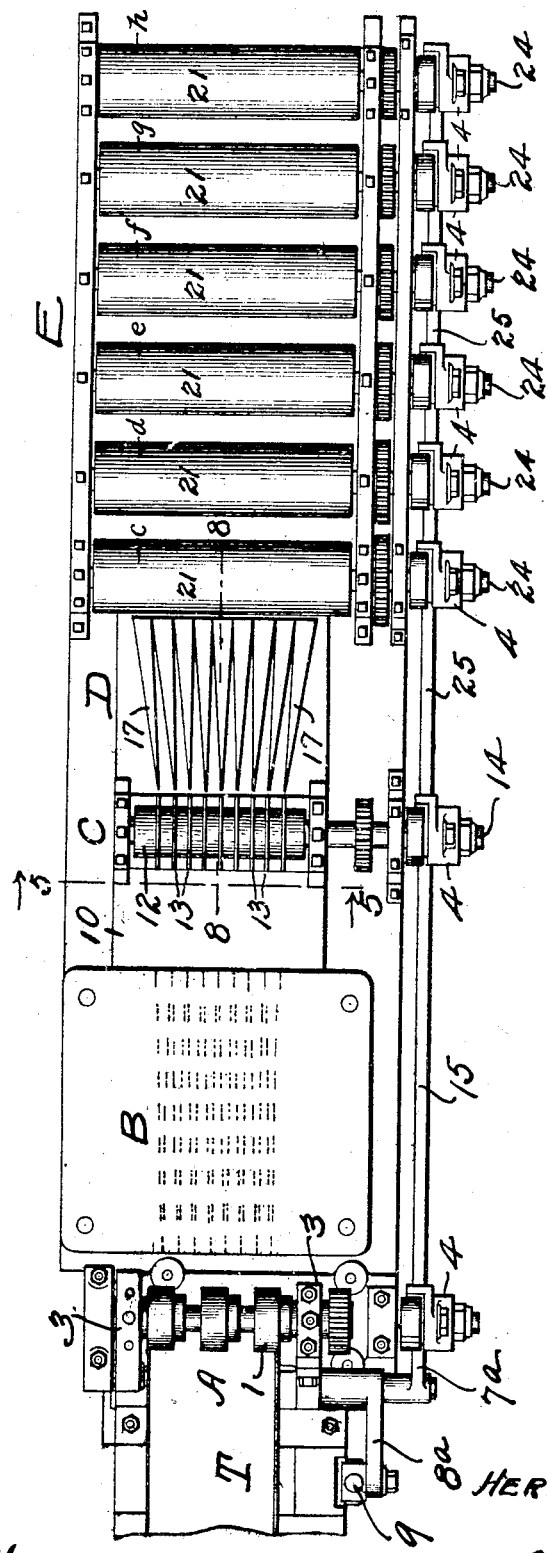

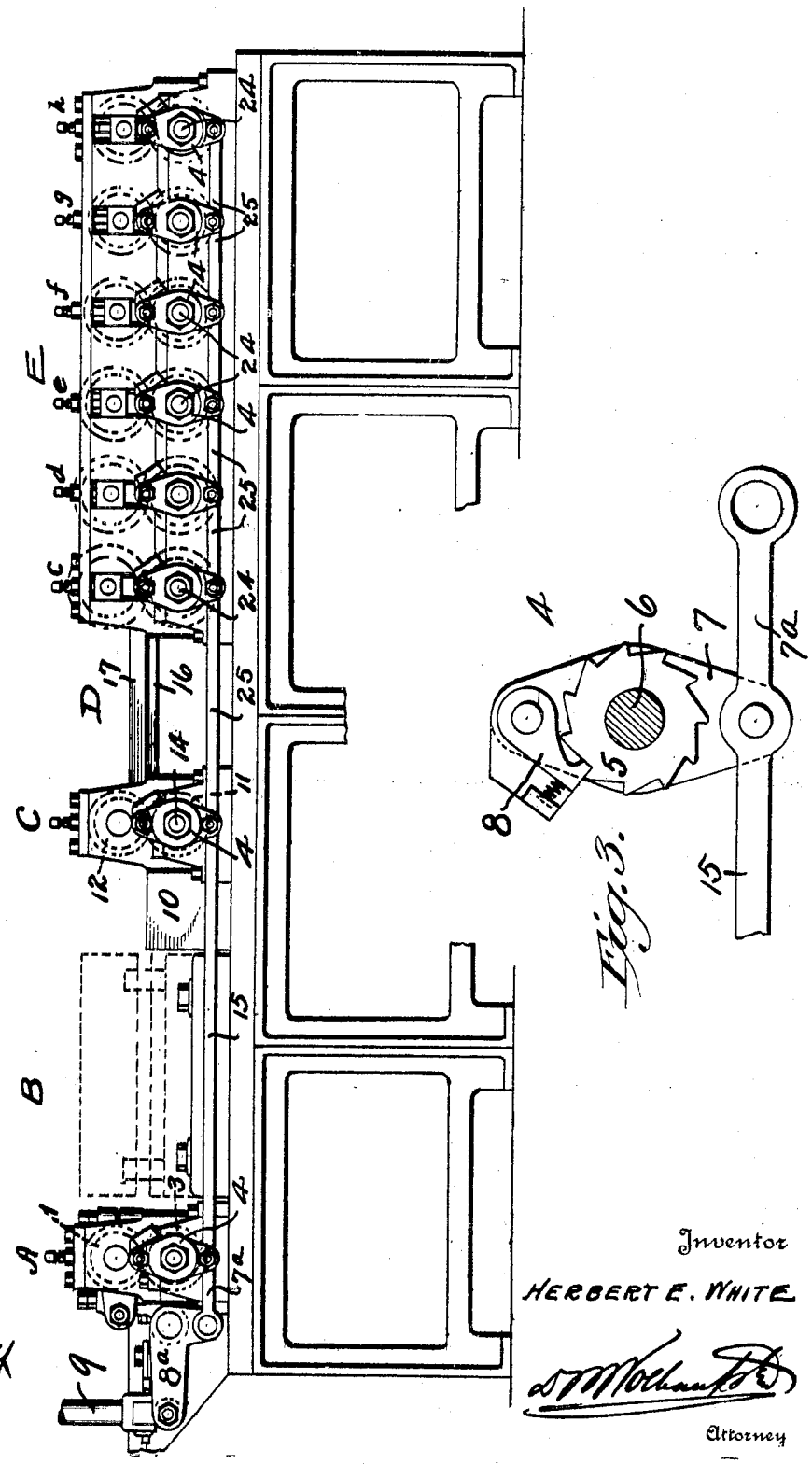

H. E. WHITE.
MACHINE FOR MAKING EXPANDED METAL.
APPLICATION FILED DEC. 14, 1915.

1,198,686.

Patented Sept. 19, 1916.
6 SHEETS—SHEET 4.

Inventor
HERBERT E. WHITE

Witness

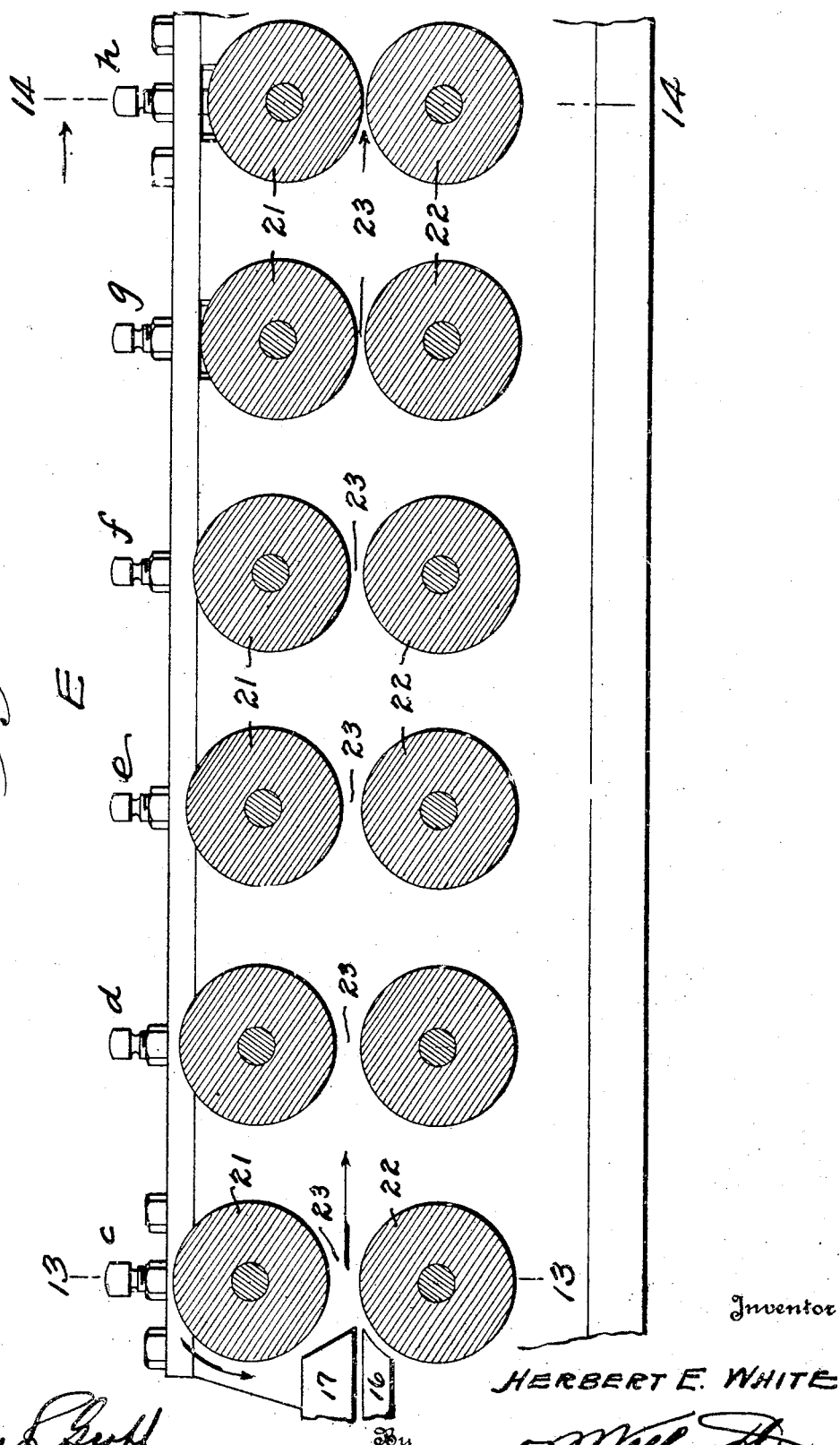

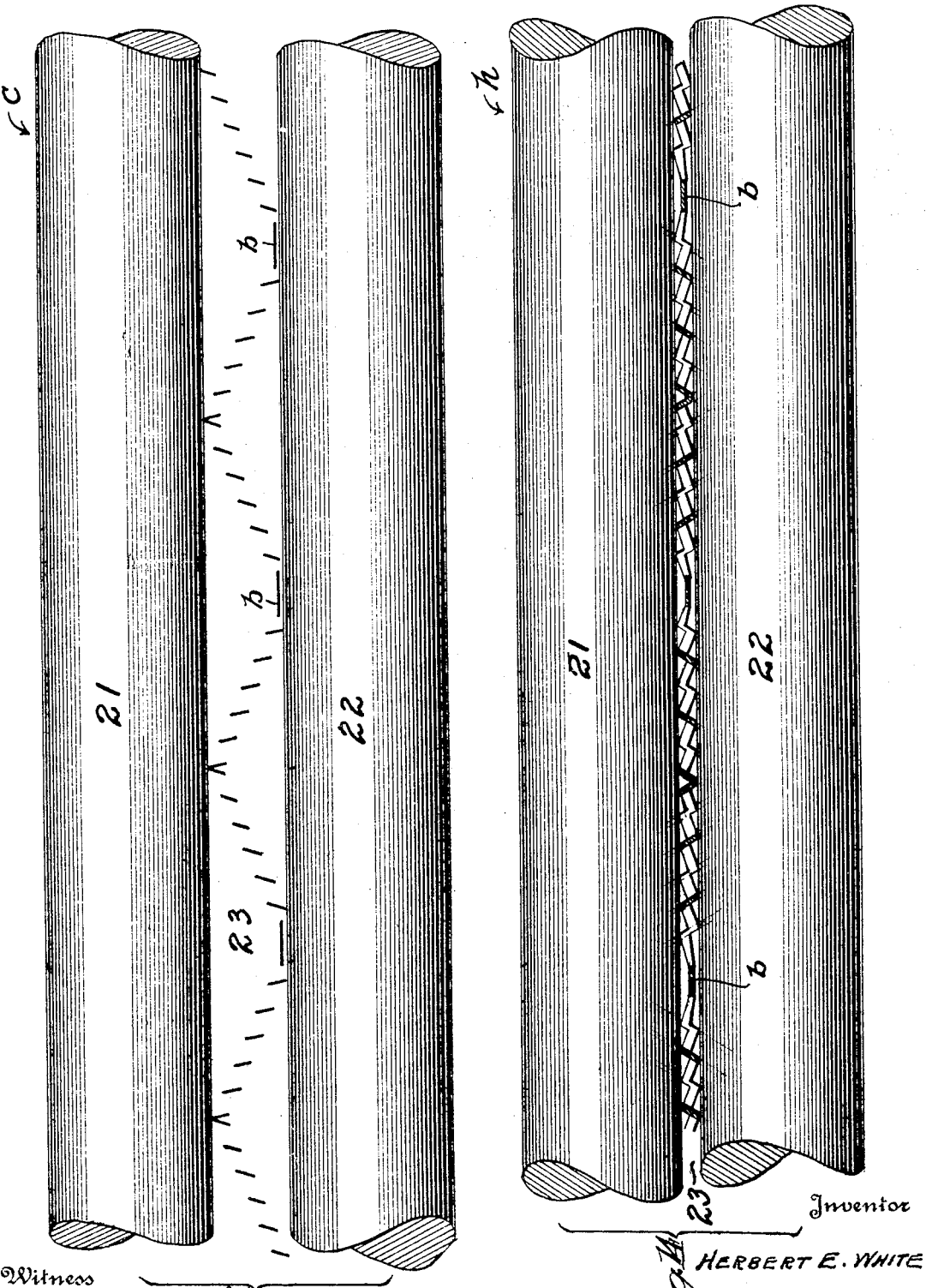

UNITED STATES PATENT OFFICE.

HERBERT E. WHITE, OF YOUNGSTOWN, OHIO.

MACHINE FOR MAKING EXPANDED METAL.

1,198,686.　　　　　Specification of Letters Patent.　　Patented Sept. 19, 1916.

Application filed December 14, 1915.　Serial No. 66,758.

*To all whom it may concern:*

Be it known that I, HERBERT E. WHITE, a citizen of the United States, residing at Youngstown, in the county of Mahoning and State of Ohio, have invented certain new and useful Improvements in Machines for making Expanded Metal, of which the following is a specification.

This invention relates to machines for manufacturing expanded sheet metal, and more particularly to an improved machine embodying means for rapidly and accurately producing a troughed expanded metal shape, and then uniformly spreading or flattening the latter to its final width and form.

To this end, the invention has for its general object a novel organization of instrumentalities so constructed and operated as to provide a continuous operation in the manufacture of the article, thereby greatly economizing in time and labor, while at the same time producing the material in its best marketable form.

A further object of the invention is to provide a novel construction of flattening unit for the troughed shape whereby the operation of flattening the material may be performed in a practical and commercial manner with a minimum frictional resistance, and without crushing or otherwise injuring the product.

Another object of the invention is to preferably combine with the flattening unit a primary guiding die which preliminarily initiates the lateral spreading of the troughed shape by decreasing the depth of the troughs to such an extent that the succeeding action of the main flattening unit will be easy and gradual, thus enabling the material to be progressively flattened to its final plane without injury.

The essential features of the invention involved in carrying out the foregoing objects are necessarily susceptible of structural change without departing from the spirit or scope of the invention, but a preferred and practical embodiment thereof is shown in the accompanying drawings, in which—

Figure 8:
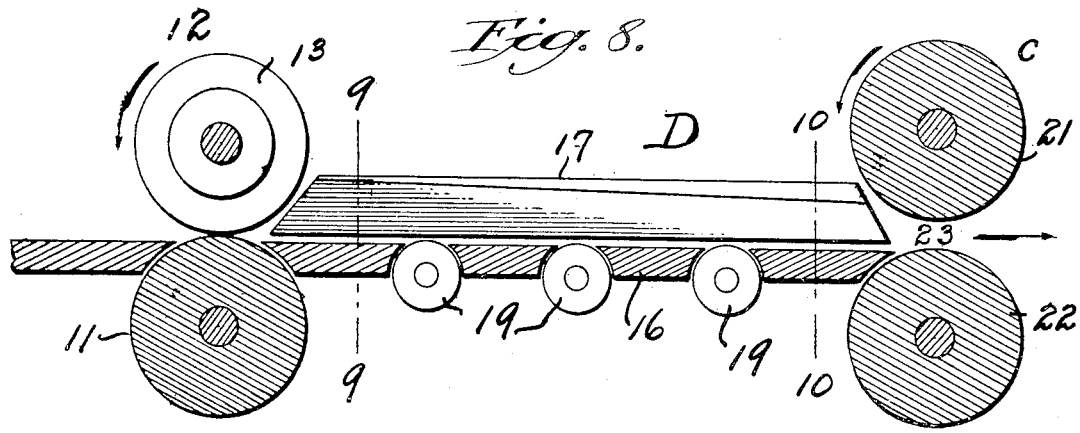
Figure 9:
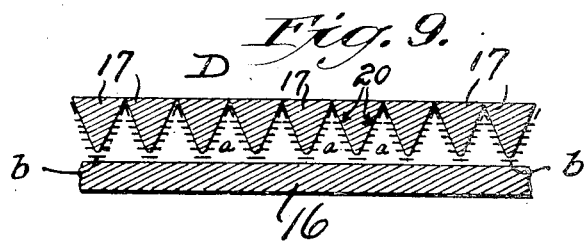
Figure 10:
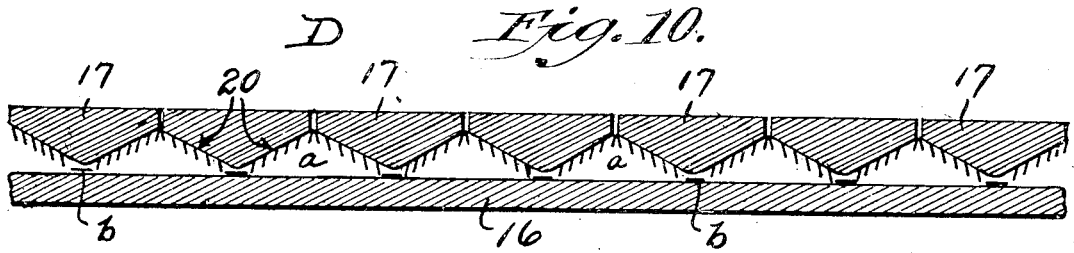
Figure 11:
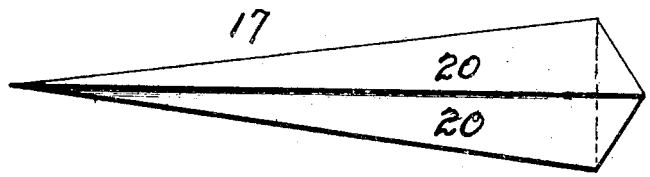

Figure 1 is a top plan view of a complete metal expanding machine embodying the synchronized organization of units contemplated by the present invention. Fig. 2 is a side elevation of the complete machine, the die press being shown in dotted lines. Fig.
3 is a detail view of a form of ratchet device that may be employed to impart intermittent movement to certain parts of the machine. Fig. 4 is a vertical central longitudinal sectional view of the complete machine. Fig. 5 is a detail elevation of the traction unit for the expanded troughed material as it is delivered from the die press, the view being indicated by the section line 5—5 on Fig. 1. Fig. 6 is a plan view of a section of the troughed expanded material as developed in the die press and as picked up by the traction unit. Fig. 7 is a cross sectional view thereof on the line 7—7 of Fig. 6, the same section being shown diagrammatically in the traction unit of Fig. 5. Fig. 8 is an enlarged longitudinal sectional view on the line 8—8 of Fig. 1 illustrating a preferred form of construction for the primary guiding die for the troughed material, said view also including the traction unit at the feeding-in side of said die and the first pair of reducing rolls of the flattening unit. Fig. 9 is a detail cross sectional view of the flattening unit adjacent its receiving end on the line 9—9 of Fig. 8, showing diagrammatically the troughed expanded shape conforming to the sinuous line formed by the adjoining guide bars. Fig. 10 is a similar sectional view on the line 10—10 of Fig. 8 adjacent the delivery end of the guiding bars, and illustrating the progressive widening of the guiding bars toward that end. Fig. 11 is a detail bottom plan view of one of the guide bars of the guiding die. Fig. 12 is an enlarged longitudinal sectional view of the main flattening unit for the troughed expanded material. Fig. 13 is a detail view of one of the intermediate roller pairs of the flattening unit, showing diagrammatically the form of the material as it passes through the straight pass formed between these rollers. Fig. 14 is a similar view of a final pair of the flattening rollers as indicated by the line 14—14 on Fig. 12, showing the reduced straight pass between these rollers, and also illustrating in section the complete fabric as reduced to its final plane by these rollers.

Similar reference characters designate corresponding parts throughout the several figures of the drawings.

As above indicated, the distinctive features of the invention are preferably embodied in an organized machine wherein the various instrumentalities are so constructed and synchronized as to provide for properly handling the sheet metal from the blank to the finished article. That is to say, the present invention contemplates a machine whose operations provide a continuous process for developing, from the blank sheet of metal, a slitted and expanded troughed shape, and subsequently flattening out the latter to its final width and form. Accordingly, a completely organized machine embodying the present invention includes a blank sheet feeder A, a die press B, a traction feeding unit C for the troughed material, a primary guiding die D for the troughed material to initiate the lateral spreading and flattening thereof, and the main flattening unit E for flattening out the troughed expanded sections and thereby bringing the material to a final shape.

For the purposes of illustration, it will be noted that the slitting and expanding operations necessary to produce the troughed expanded sheet may be, and are, successfully performed by the action of the slitting and expanding dies preferably of the character and arrangement disclosed in my former Patent No. 1,049,632, dated January 7, 1913. These dies are operated within a suitable die press diagrammatically indicated in the drawings, and designated by the reference character B. The effect of dies, constructed and arranged in the manner fully explained in the patent referred to, is to slit the sheet and at the same time deform the slitted areas into a series of approximately V-shaped troughed expanded sections designated by the letter $a$, in the several figures of the drawings exhibiting this shape, and the latter is also preferably formed with uncut or unslitted stiffening strips $b$, extending lengthwise of the fabric and substantially flat and straight throughout. These strips afford substantial engaging surfaces for the active elements of the traction unit to be presently referred to, and also provide substantial bearing surfaces for engagement with the elements of the flattening devices of the machine, thereby giving sufficient resistance to the flattening pressure, exerted both in the guiding die and in the main flattening unit, to permit of the gradual and uniform flattening down of the troughs without crushing of the reticulated sections. It should be observed in connection with the uncut stiffening strips $b$ that while these strips are illustrated as being uncut or unslitted, and also as being flat and straight throughout, it will of course be understood that this is not an essential detail as far as the present invention is concerned, because such strips may be grooved or ungrooved, if desired, or may or may not be slitted. However, in any form of construction, the lengthwise strips or ribs $b$ are utilized for the purposes indicated.

According to the preferable organization of parts, the blank sheet of metal is intermittently fed to the slitting and expanding dies of the press feed by means of the blank sheet feeder A. This feeder A may be of any suitable construction operating in conjunction with a feeding table T for the blank sheet, but for purposes of illustration is shown as consisting of a pair of feeding rolls 1 and 2 having their journal extremities mounted in suitable housings 3. These feeding rolls are preferably of uniform size and are geared together, as indicated, for movement in unison at the same peripheral rate of speed. The said rolls may be driven intermittently by any suitable means, such for instance as by the ratchet device 4 shown in Fig. 3 of the drawings, said ratchet device primarily consisting of a ratchet disk 5 on one of the roll extremities 6, and a swinging pawl carrier 7 loosely hung on the journal extremity 6 and carrying the propelling pawl 8. The swinging pawl carrier 7 is shown connected by a link $7^a$ with a bell crank $8^a$ having an operating connection 9 with an engine, motor, or any other suitable source of power. The effect of the ratchet device referred to is to give to the rolls 1 and 2 an intermittent movement so that the blank sheet is advanced through the die press B a step at a time to accommodate the same to the successive cuttings of the dies of the press.

The shape of the material as it issues from the die press has already been described and is shown in Fig. 7 of the drawings. This shape is the troughed expanded material referred to, and preferably passes over a suitable guiding table 10 leading to the traction feeding unit C. This unit is preferably of the construction shown in Fig. 5 of the drawings, and consists of a smooth plain supporting member 11, as for instance a cylindrical roller of uniform diameter throughout, and a tractor member 12 superimposed over the supporting roller 11. The said tractor member 12 preferably consists of a plurality of tractor disks or collars 13 arranged in regularly spaced relation corresponding to the spacing between the expanded sections of the troughed shape so that the peripheries of said disks or collars will have a tractional engagement with the longitudinal uncut strips $b$ of the material. Thus, the disks 13 positively advance the troughed material with sufficient firmness through the guiding die and the main flattening unit to properly perform the operation of spreading and flattening the sheet to its final form and width. In order to secure harmony of operation, it is necessary to synchronize the action of the unit C with the action of the units A and B, and this may be accomplished for instance by the means shown, namely to gear together the members 11 and 12 of the traction unit, as indicated by dotted lines in Fig. 2, and to supply the journal extremity 14 of one of said members with a ratchet device 4 of the construction already described, and which ratchet device has a link connection 15 with the pawl carrier of the corresponding device of the unit A, thus securing the necessary unison of action.

The traction feeding unit C is associated with one of the distinctive features of the present invention, that is, with the primary guiding die D. This die is interposed between the unit C and the main flattening unit E. It has an important function to perform in that it not only provides a guiding means for holding the troughed expanded material to its proper form as it is directed into the main flattening unit, but also involves an operation preliminary to the flattening and spreading operation of the said main flattening unit. That is to say, the primary guiding die initiates the widening of the angle between the sides of the troughs with the consequent reduction in the height of the latter, or, in other words, prepares the troughed material to a form that may be started in the main flattening unit without danger of being buckled when the unit receives the troughed shape. In further explanation of this preliminary flattening step, it may be observed that the action of the guiding die increases the included angle, between the two sides of each trough, usually to an angle greater than 90°.

Structurally, the primary guiding die may assume different forms of construction. A preferable construction, however is shown in the drawings, namely as consisting of a lower table member 16, and a transverse series of upper guide bars 17 arranged horizontally over the table member. The latter may be of any preferred construction, but in the illustrated form the said table member is of the "roller table" type, embodying stationary table sections, interrupted at suitable points, by friction reducing supporting rollers 19 forming a part of the supporting surface of the table.

The lower table member 16 of the guiding die combines with the guide bars 17 to form a suitable die pass through which the troughs of the troughed expanded sheet slide, although in the construction shown, the table forms a bottom support for the material in the die, while the guide bars 17 are the active elements which form a sinuous pass corresponding to the shape of the troughed material, and also exert a spreading and flattening force upon the material. At the receiving end of the guiding die, as shown in Fig. 9, the sinuous pass provided by the guide bars is narrower in width and deeper vertically than at the delivering end, where the die pass has become flatter or shallower in vertical depth and wider transversely of the machine. This is provided for, in the form of construction selected for illustration, by the form of the guide bars and their disposition within the machine. Structurally the guide bars are preferably of substantially V-shape in cross section and their active portions are graduated in thickness and width. This is best shown in Figs. 9, 10 and 11 of the drawings illustrating each guide bar as being of a double beveled or V-shape in cross section, producing the inclining sides 20, and tapering toward one end both laterally and vertically, so as to adapt itself to the constantly increasing angle of the troughs of the material as the said troughs diminish in height. A further feature of the stationary guiding die D which is essential to the successful operation of the machine is that of arranging the guide bars divergently from the receiving to the delivery ends thereof, thereby providing means whereby the troughed expanded material will be given a gradual fan-like movement, causing a partial widening of the sheet and a partial flattening of the troughs to place the material in a form best adapted to be received by the main flattening unit E.

The main flattening unit E is of a simple but very effective construction. It essentially comprises a plurality of roller pairs arranged in successive and progressive order. Any required number of roller pairs may be employed, and as shown in the drawings these are designated respectively by the reference letters c, d, e, f, g and h. These roller pairs are of duplicate construction, each of the same consisting of a pair of superposed pressure rolls 21 and 22 arranged one above the other, and in spaced relation to provide between them a straight reducing pass 23 for the material passing therethrough. The rolls of each pair are preferably plain surfaced rolls of uniform diameter throughout, and arranged in parallel relation, thus defining a reducing pass 23 having upper and lower parallel sides formed by the smooth surfaces of the rolls. The said pass may therefore be characterized as a "straight" pass, as distinguished from the "sinuous" pass of the guiding die and extends out to the ends of the rolls so that the material can freely slide laterally as the troughs are progressively and gradually flattened out. The graduated or progressive flattening operation, performed by the several roller pairs of the flattening unit, is made possible by the feature of progressively diminishing the distance between the rolls of succeeding pairs. In this connection, it will be observed that this relation between the width of the passes between succeeding rolls is not necessarily limited to immediately adjacent roller pairs, but the result to be obtained is accomplished by having the progressive order maintained at any desired points throughout the unit, so that there will always be the condition existing where certain of the rolls have a less distance between them than preceding rolls. It is also desirable, in carrying forward the invention, that all of the rolls of the flattening unit shall rotate at the same peripheral rate of speed. They must also be rotated intermittently in synchronism with the units A and C. These results may be conveniently accomplished for instance by gearing together the two rolls of each pair as shown in the drawings, and supplying one of the journal extremities 24 thereof with a pawl and ratchet device 4 having the construction and action already described, and coupled by suitable connecting links 25 to each other and also to the other ratchet devices of the said other units. As the troughed expanded shape moves through the progressively diminishing passes of the flattening unit, the troughed reticulated section will be gradually flattened out until the structure emerges from the final pass completed as to form and width, and in which all parts of the structure have been brought into substantially the original flat plane of the sheet. This is shown in Fig. 11 of the drawings.

From the foregoing, it is thought that the construction, operation, and advantages of the herein described metal expanding machine will be readily apparent without further description, and it is to be further understood that changes in the form, proportion, and minor details of construction may be resorted to without departing from the spirit or scope of the appended claims.

I claim:

1. A machine for making expanded sheet metal including a main flattening unit for the expanded troughed shape, a primary guiding die arranged as a feeder for the flattening unit and having means for initiating the flattening of the troughs, and a traction feeding unit arranged at the receiving end of the die.

2. A machine for making expanded sheet metal including a main flattening unit for the expanded troughed shape, a primary guiding die arranged as a feeder for the flattening unit, and a traction feeding unit arranged to feed to the die and having traction elements engaging portions of the material between the troughs.

3. A machine for making expanded sheet metal including a main flattening unit for the expanded troughed shape, a primary guiding die for feeding the troughed shape to said unit, and a traction feeding unit for feeding the troughed shape to the die and having traction elements engaging longitudinal strip portions of the material between the troughs.

4. A machine for making expanded sheet metal including a main flattening unit, a primary guiding die for feeding the troughed shape to said unit, and a traction feeding unit for the die, said feeding unit consisting of a lower supporting member and an upper tractor member comprising a plurality of spaced tractor disks adapted to engage portions of the material between the troughs.

5. A machine for making expanded sheet metal including a primary guiding die for an expanded troughed shape having means for reducing the height of the troughed sections and spreading the material laterally, and a feeding unit for the die consisting of a lower roller and an upper member comprising a plurality of spaced tractor disks adapted to engage portions of the material between the troughs.

6. A machine for making expanded sheet metal including a guiding die for the expanded troughed shape having a sinuous diverging die pass, and a flattening unit arranged beyond the die and having a converging straight pass.

7. A machine for making expanded sheet metal including a guiding die for the expanded troughed shape having a sinuous laterally diverging die pass, and a flattening unit having a longitudinally converging straight pass.

8. A machine for making expanded sheet metal including a guiding die for the expanded troughed shape having a sinuous laterally diverging die pass, and a flattening unit having a succession of straight passes of progressively diminishing width.

9. A machine for making expanded sheet metal including a guiding die for the expanded troughed shape having a sinuous laterally diverging die pass, and a flattening unit having a plurality of horizontal straight passes progressively diminishing in width to form a main pass through the unit which converges toward the delivery end thereof.

10. A machine for making expanded sheet metal including a guiding die for the expanded troughed shape consisting of a series of cross sectionally angular diverging guide bars arranged to provide a sinuous die-pass which progressively increases in width and progressively diminishes in depth, and a flattening unit arranged beyond the die and having a longitudinally converging straight pass.

11. A machine for making expanded sheet metal including a guiding die for the expanded troughed shape having a sinuous diverging die pass, and a flattening unit consisting of a plurality of roller pairs having progressively diminishing straight passes.

12. A machine for making expanded sheet metal including a flattening unit for the expanded troughed shape comprising a plurality of roller pairs having progressively diminishing straight passes.

13. A machine for making expanded sheet metal including a flattening unit for the expanded troughed shape comprising a plurality of roller pairs, each consisting of a pair of superposed pressure rolls in spaced relation to provide between them a straight reducing pass.

14. A machine for making expanded sheet metal including a flattening unit for the expanded troughed shape comprising a plurality of roller pairs, each consisting of a pair of superposed pressure rolls in spaced relation to provide between them a straight reducing pass, the passes formed by said rolls progressively diminishing in width.

15. A machine for making expanded sheet metal, including a flattening unit for the expanded troughed shape comprising a plurality of roller pairs, each consisting of a pair of superposed pressure rolls having plain surfaces at the same peripheral speed, the rolls of each pair being in spaced relation to provide a pass between them, and the several passes formed by the rolls progressively diminishing in width.

In testimony whereof I hereunto affix my signature in the presence of two witnesses.

HERBERT E. WHITE.

Witnesses:
   C. W. ALLEN,
   B. H. POTTS.